(12) United States Patent
Sakakibara

(10) Patent No.: US 6,191,560 B1
(45) Date of Patent: Feb. 20, 2001

(54) BATTERY CHARGER

(75) Inventor: Kazuyuki Sakakibara, Anjo (JP)

(73) Assignee: Makita Corporation (JP)

( * ) Notice: Under 35 U.S.C. 154(b), the term of this patent shall be extended for 0 days.

(21) Appl. No.: 09/347,338

(22) Filed: Jul. 2, 1999

(30) Foreign Application Priority Data

Jul. 3, 1999 (JP) .................................................. 10-204389

(51) Int. Cl.⁷ .................................................... H02J 7/04
(52) U.S. Cl. .......................................... 320/150; 320/137
(58) Field of Search ..................... 320/150, 137, 320/134, 154, 110

(56) References Cited

U.S. PATENT DOCUMENTS

| | | | |
|---|---|---|---|
| 5,497,068 | * 3/1996 | Shiojima | 320/150 |
| 5,652,500 | 7/1997 | Kadouchi et al. | 320/150 |
| 5,739,673 | 4/1998 | Le Van Suu | 320/139 |
| 5,886,527 | 3/1999 | Ito | 324/431 |
| 5,909,101 | * 6/1999 | Matsumoto et al. | 320/110 |
| 5,912,546 | * 6/1999 | Sakou et al. | 320/134 |
| 5,912,547 | 6/1999 | Grabon | 320/150 |

FOREIGN PATENT DOCUMENTS 0621 990 B1    6/1996 (EP) .

* cited by examiner

Primary Examiner—Peter S. Wong
Assistant Examiner—Lawrence Luk
(74) Attorney, Agent, or Firm—Welsh & Katz, Ltd.; Thomas W. Tolpin

(57) ABSTRACT

A map is retrieved based on a battery temperature and a temperature rise value (in a step S40) and an allowable current value, with which a battery can be charged while battery temperature rise is being suppressed, is obtained and the battery is charged with the allowable current value (in a step S42). By doing so, it is possible to charge a nickel metal hydride battery in a short time without causing deterioration due to temperature rise. If it is determined that a battery state is not in a final charging period from the change of battery voltage ('Yes' in a step S30), a change in temperature is corrected (in a step S34) and a relatively high allowable current value is thereby obtained from the map (in a step S40). That is, before the final charging period, battery charge can be completed in a short time by applying high current without switching current values for adjustment purposes.

15 Claims, 15 Drawing Sheets

Fig. 10
(A)
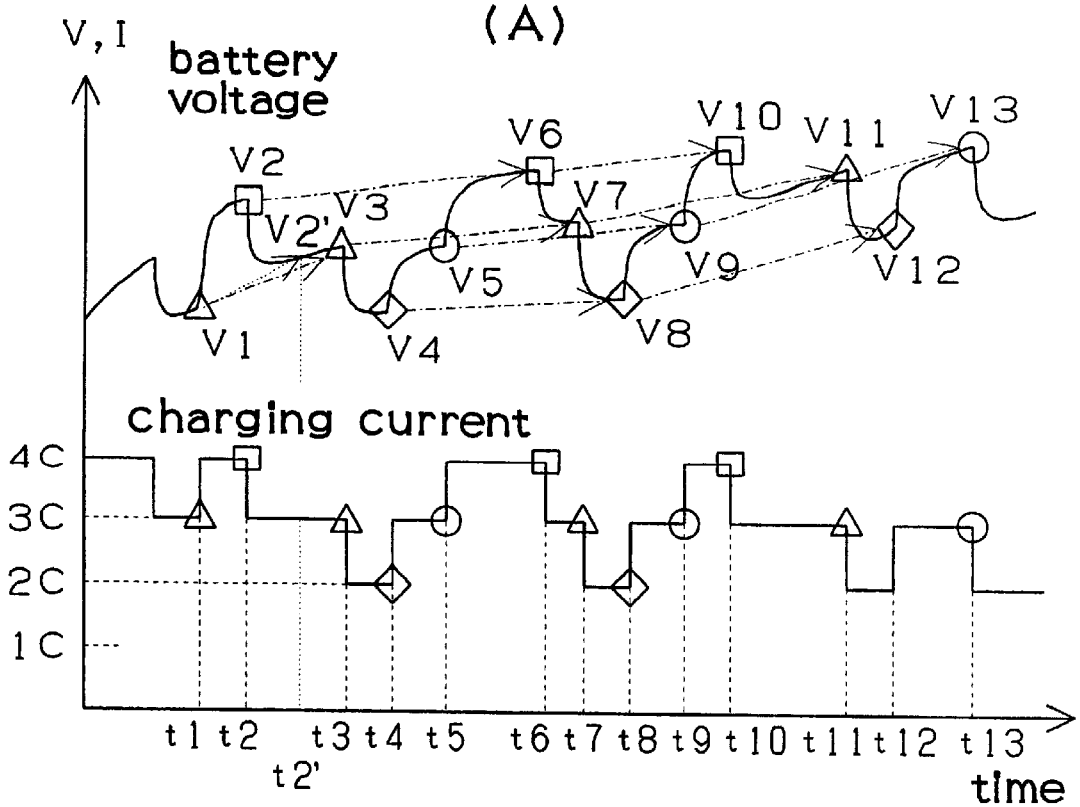
(B)
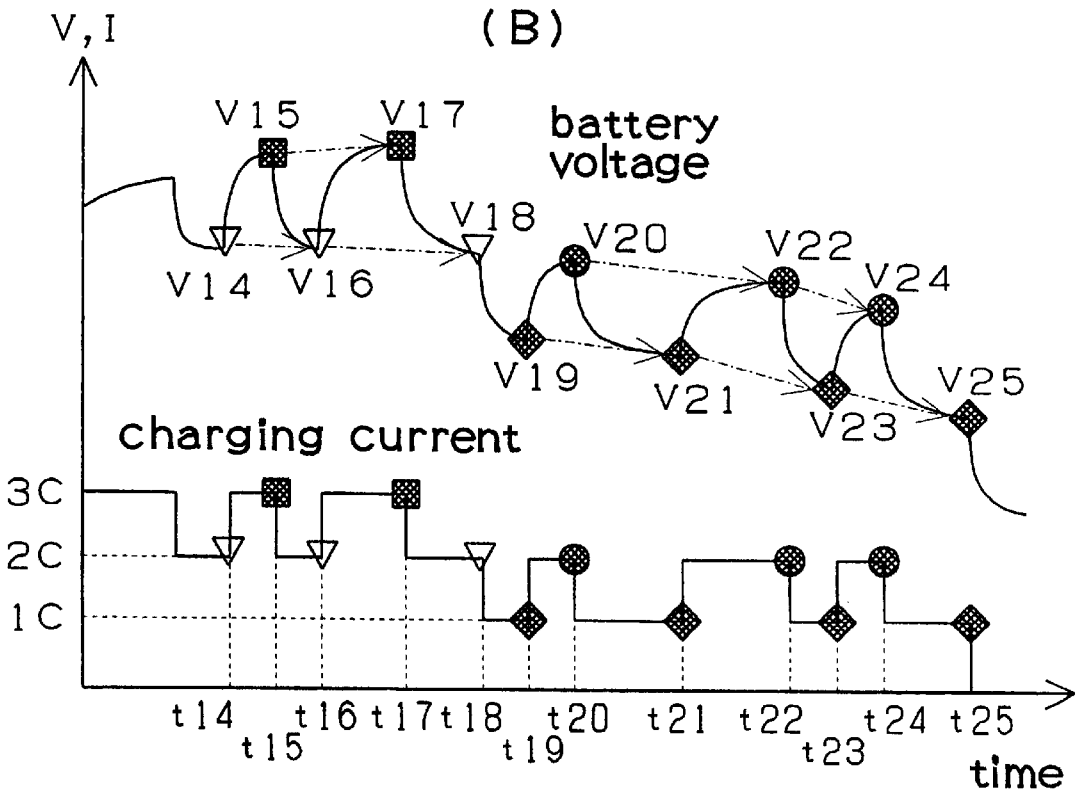

BATTERY CHARGER

BACKGROUND OF THE INVENTION

1. Field of the Invention

The present invention relates to a battery charger suited or charging a battery, such as a nickel metal hydride battery, which emits high heat while being charged.

2. Description of the Related Art

Presently, a chargeable battery which can be repeatedly used for the power supply of, for example, a power tool is used. A nickel cadmium battery is popular as a battery for the power tool, and a battery charger for quickly charging a battery by applying high current to the battery is used. Specifically, the battery is quickly charged in about 20 minutes and a power tool can be continuously used by changing a battery to a battery which has been charged.

The inventor of the present invention studied improving the performance of a power tool by using a nickel metal hydride battery as a battery therefore. Although the nickel metal hydride battery can increase a capacity compared to a nickel cadmium battery, it generates high heat while being charged. If the temperature of the battery becomes high by the generated heat, the electrodes and separator of the cell within the battery deteriorate and battery life is shortened. Due to this, it is impossible to quickly charge the nickel metal hydride battery with high current as done for the nickel cadmium battery stated above.

Considering this, the inventor of the present invention contrived charging a battery while changing charging current based on a map in which the absolute temperatures of the battery and temperature rise values are mapped and detecting completion of battery charge from the map. However, if charging a battery by using this method, the switching of current values occurs frequently even in the earlier and medium periods of battery charge and charging time is disadvantageously lengthened. That is, the states of batteries to be charged vary such as one which capacity is almost zero and one which capacity remains almost full. Here, it is necessary to create the map as the greatest common measure of various states. In case of charging the above-mentioned batteries in various states or, for instance, charging a battery which capacity is almost zero in accordance with the map, current is switched to low current (such as 3C) based on detected temperature rise values even while the maximum current capacity (such as 4C) of the battery charger can be applied to the battery, thereby making time longer for completing battery charge. Further, in case of determining charge completion based on the map, it sometimes occurs that charge completion is determined after charging capacity exceeds 100% depending on the conditions.

Moreover, in case of obtaining charging current by retrieving a map from the absolute temperature of the battery and the temperature rise value, it is required that the battery temperature rise value, i.e., the accuracy of a temperature differential value is high so as to obtain an appropriate charging current value. In other words, if the accuracy of detecting the temperature differential value is low, an appropriate temperature value is not selected to thereby cause unnecessary switching of charging current as stated above. In that case, however, as temperature resolution increases, cost increases. It is, therefore, needed that unnecessary switching of current values can be prevented without increasing temperature resolution.

BRIEF SUMMARY OF THE INVENTION

An object of this invention is to provide a battery charger capable of charging a battery in a short time while the temperature rise of the battery is being suppressed in accordance with the state of the battery.

A still further object of this invention is to provide a battery charger capable of 100% charging a battery without overcharge.

A battery charger according to the present invention comprising;

a storage device storing a map, in which an allowable current value, with which a battery can be charged while a temperature rise of the battery is being suppressed, is mapped based on a battery temperature value and a battery temperature rise value;

temperature detecting means for detecting a present battery temperature;

temperature rise value outputting means for obtaining the temperature rise value from the temperature detected by said temperature detecting means;

charging state determining means for detecting a battery voltage and determining whether a battery state is in a final charging period based on change of the battery voltage;

allowable current value retrieving means for retrieving the map corresponding to the battery charger temperature, based on the temperature detected by said temperature detecting means and the temperature rise value outputted from said temperature rise value outputting means, and for obtaining said allowable current value, the allowable current value retrieving means obtaining a relatively high allowable value if it is determined that the battery state is not in the final charging period by said charging state determining means; and charging means for charging the battery with the allowable current value retrieved by said allowable current value retrieving means.

A battery charger according to the present invention comprising;

a storage device storing a map, in which an allowable current value, with which a battery can be charged while a temperature rise of the battery is being suppressed, is mapped based on a battery temperature value and a battery temperature rise value, in accordance with at least a final charging period and a period before the final charging period;

temperature detecting means for detecting a present battery temperature;

temperature rise value outputting means for obtaining the temperature rise value from the temperature detected by said temperature detecting means;

charge state detecting means for detecting a battery voltage and for determining whether a battery state is in the final charging period based on change of the battery voltage;

allowable current value retrieving means for retrieving the map corresponding to the battery state determined by said charge state determining means, based on the temperature detected by said temperature detecting means and the temperature rise value outputted from said temperature rise value outputting means, and for obtaining said allowable current value; and charging means for charging the battery with the allowable current value retrieved by said allowable current value retrieving means.

In accordance with the more preferred teaching of the present invention, said charge state determining means obtains a change in battery voltage based on voltage values having a same allowable current value switch pattern by said charging means.

In accordance with the more preferred teaching of the present invention, said charge comprises completing means for detecting the battery voltage and for completing battery charge if charge completion is determined based on a battery voltage decrease value.

A battery charger according to the present invention characterized by comprising;

a storage device storing a map, in which an allowable current value, with which a battery can be charged while a temperature rise of the battery is being suppressed, is mapped based on a battery temperature value and a battery temperature rise value, the allowable current value set at a low value if the battery temperature value is high and set at a low value if the temperature rise value is high;

temperature detecting means for detecting a present battery temperature;

temperature rise value outputting means for obtaining the temperature rise value from the temperature detected by said temperature detecting means;

allowable current value retrieving means for retrieving the map of said storage device based on the temperature detected by said temperature detecting means and the temperature rise value outputted from said temperature rise value outputting means, and for obtaining said allowable current value;

charging means for charging the battery with the allowable current value retrieved by said allowable current value retrieving means;

first count value outputting means for determining whether the temperature detected by said temperature detecting means and the temperature rise value outputted from said temperature rise value outputting means belong to a region which tends to occur in a final charging period in the map of said storage device, for outputting a low count value if the temperature detected by said temperature detecting means and the temperature rise value outputted from said temperature rise value outputting means belong to the region which tends to occur at a beginning of the final charging period and for outputting a high count value if they belong to a region which tends to occur at an end of the final charging period;

second count value outputting means for detecting a battery voltage and outputting a count value if it is determined that a battery state is in the final charging period based on a battery voltage decrease value;

charge completion determining means for determining completion of battery charge if a sum of the count values outputted from said first count value outputting means and said second count value outputting means exceeds a preset value; and charge completing means for completing the battery charge based on determination of completion of battery charge by said charge completion determining means.

In accordance with the more preferred teaching of the present invention, said second count value outputting means obtains the battery voltage decrease value based on voltage values having a same allowable current value switch pattern by said charging means.

The battery charger employs a map in which an allowable current value is mapped based on a battery temperature and a battery temperature rise value, with which a battery can be charged while battery temperature rise is being suppressed, and controls a charging current value. That is, by retrieving the map based on the battery temperature and the temperature rise value, an allowable current value, with which a battery can be charged while battery temperature rise is being suppressed, is obtained and the battery is charged with the allowable current value. Due to this, it is possible to charge a nickel metal hydride battery, in a short time which temperature tends to rise during charge, without causing deterioration due to temperature rise. In this case, if charge state determining means determines that a battery state is not in a final charging period, allowable current value retrieving means obtains a relatively high allowable value. That is, before the final charging period, battery charge is completed in a short time by applying high current without switching current values for adjustment purposes.

The battery charger employs a map in which an allowable current value is mapped and controls a charging current value, with which a battery can be charged while battery temperature rise is being suppressed. That is, by retrieving the map based on the battery temperature and the battery rise value, an allowable current value with which a battery can be charged while battery temperature rise is being suppressed is obtained and the battery is charged with the allowable current value. Due to this, it is possible to charge a nickel metal hydride battery in a short time, which temperature tends to rise during charge, without causing deterioration due to temperature rise. In this case, it is determined whether a battery status is before or in a final charging state based on the change of battery voltage and allowable current according to the battery charged state which is obtained from the map. Thus, it is possible to conduct optimum charging current control according to the battery charged status.

In the battery charger, charge status determining means obtains a change in battery voltage by the charging means, based on voltage values having the same allowable current value switch pattern. Due to this, even if the battery is charged while charging current is being switched, it is possible to determine the battery state appropriately based on the battery voltage.

In the battery charger, the battery voltage is detected and battery charge is completed if it is determined that battery charge is completed based on the change of the battery voltage. It is, therefore, possible to surely complete battery charge.

In the battery charger, it is determined whether battery temperature and a battery rise value belong to a region which tends to occur in a final charging period in the map and whether battery charge is completed based on battery voltage. In this case, a low count value is added if they belong to the region which tends to occur at the beginning of the final charging period, and a count value is added if battery voltage decrease is large. If the sum of the count values exceeds a preset value, it is determined that battery charge is completed. That is, if temperature rise is large, temperature rise is still large even with a charging current value being lowered and battery voltage decrease is large, then a high count value is added. If temperature rise is large but temperature rise does not increase greatly by lowering the charging current value, a low count value is added. Thus, it is possible to charge the battery 100% without overcharge, irrespective of the residual capacity of the battery, temperature and the like.

In the battery charger, the second count value outputting means obtains the battery voltage decrease value based on voltage values having the same allowable current value switch pattern by the charging means. Due to this, even if the battery is charged while charging current is being switched, it is possible to determine the battery state appropriately based on the battery voltage.

BRIEF DESCRIPTION OF THE DRAWING

FIG. 10A is a graph showing battery voltage and battery current from the start of battery charge to the medium period of battery charge and FIG. 10B is a graph showing battery voltage and battery current from the final period of battery charge to the completion thereof;

DESCRIPTION OF THE EMBODIMENTS

Battery chargers in the embodiments of the present invention will be described with reference to the accompanying drawings.

Figure 1:
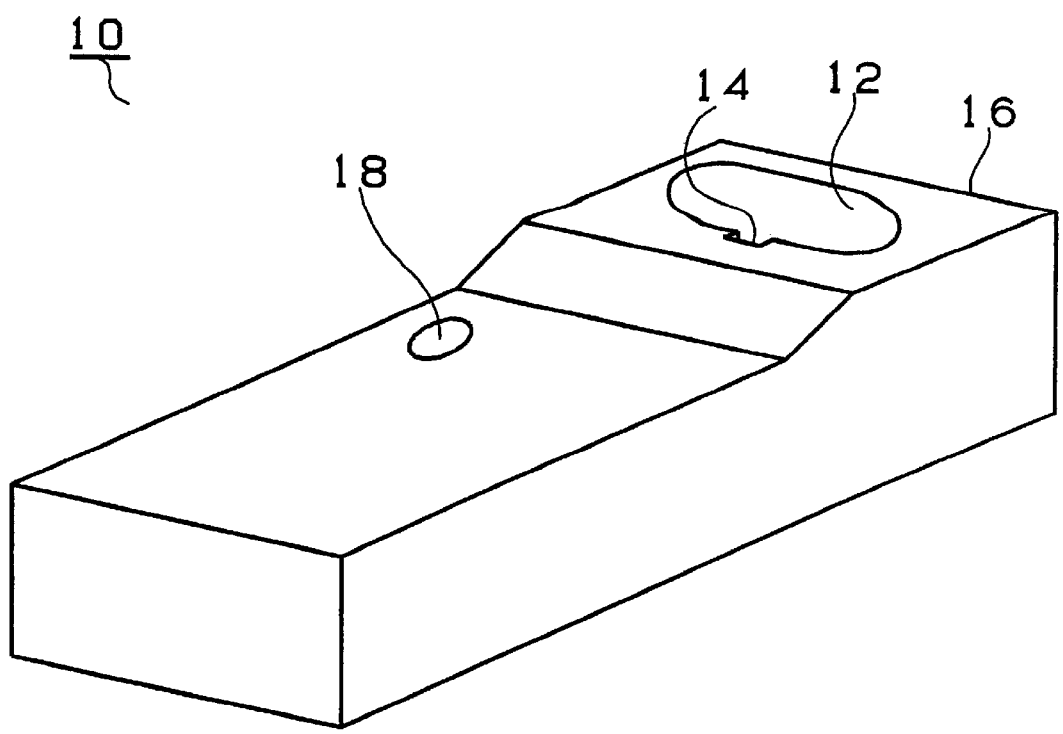
FIG. 1 is a perspective view of a battery charger in the first embodiment according to the present invention.
Figure 2:
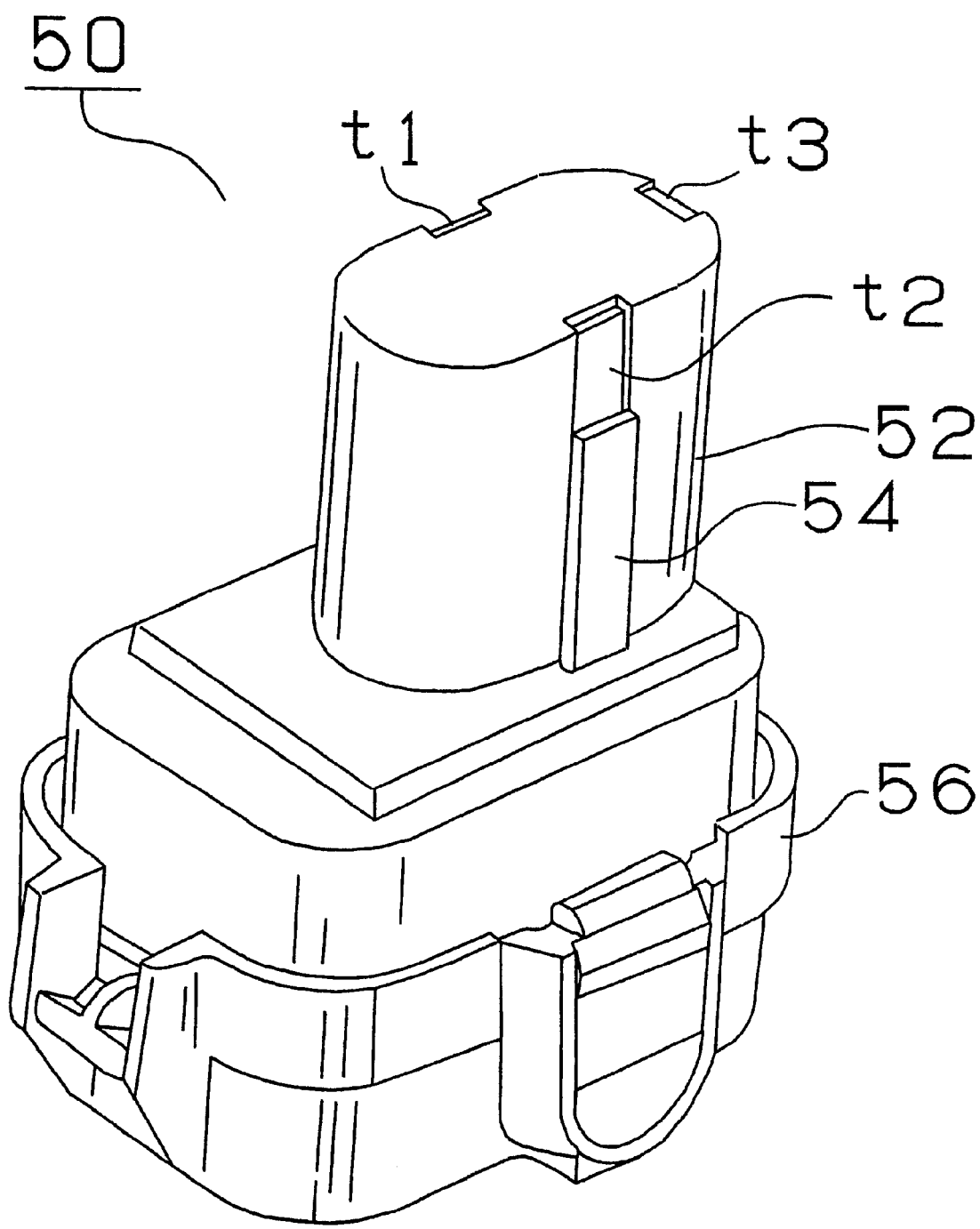
FIG. 2 is a perspective view of a battery pack in the first embodiment according to the present invention.
Figure 3:
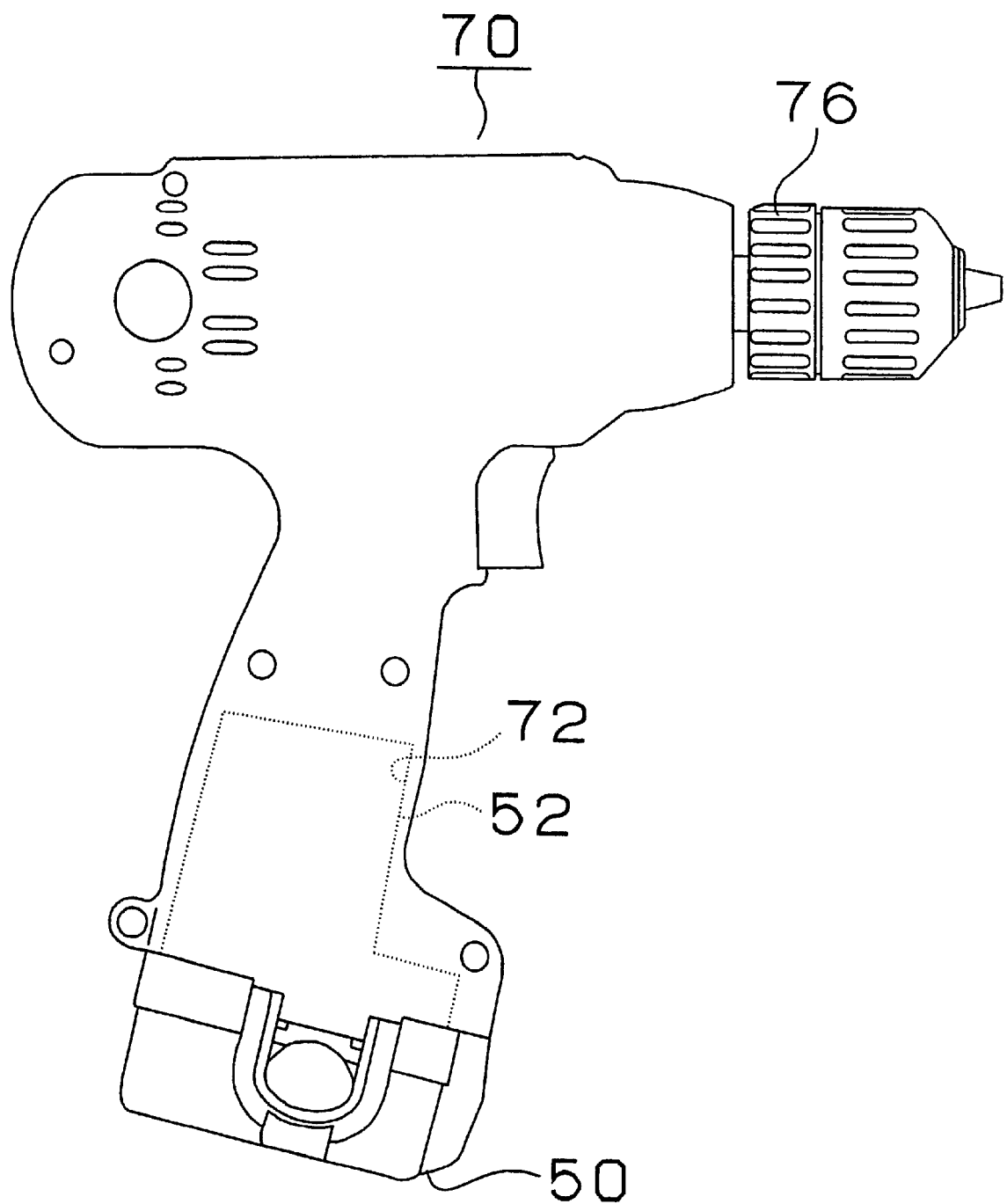
FIG. 3 is a side view of a battery drill using the battery pack shown in FIG. 2.

FIG. 1 shows a battery charger 10 in the first embodiment, FIG. 2 shows a battery pack 50 (for a nickel metal hydride battery) and FIG. 3 shows a battery drill 70 driven by the battery pack 50.

As shown in FIG. 2, the battery pack 50 containing a nickel metal hydride battery consists of a generally cylindrical fitted part 52 and a generally prismatic base 56. A key-shaped key part 54 is formed on the side of the fitted part 52 and the first input terminal t1 connected to the positive electrode of the battery, the second input terminal t2 connected to the negative electrode thereof and the third terminal t3 connected to a temperature detecting sensor consisting of a thermistor are arranged on the upper portion of the fitted part 52. The battery pack 50 is adapted to different voltages, i.e., 14.4 V, 12 V and 9.6 V, based on the difference in the number of battery cells contained therein.

As shown in FIG. 1, the battery charger 10 charging the battery packs 50 is provided with a fitting hole 12 into which the fitted part 52 of the battery pack 50 is fitted. A key way for introducing the key part 54 of the fitted part 52 is formed on the sidewall of the fitting hole 12. The fitting hole 12 is resin molded integrally with a housing 16 for forming the battery charger 10. In this embodiment, the key part 54 is provided at the fitted part 52 of the battery pack 50 and the key way 14 is provided at the fitting hole 12 of the battery charger 10, thereby preventing the battery pack 50 from being installed in a wrong direction. The first to third output terminals, which are not shown, are provided at the bottom of the fitting hole 12 to contact with the first to third terminals t1, t2 and t3 of the battery pack 50, respectively. An LED lamp 18 is provided on the upper portion of the battery charger 10 to indicate that a battery is being charged.

As shown in FIG. 3, the battery drill 70 is provided with a fitting hole 72 into which the fitted part 52 of the battery pack 50 is fitted, and is constituted to rotate a chuck 76 by a motor, which is not shown, by the supply of power from the first input terminal t1 and the second input terminal t2 of the battery pack 50. When the battery drill 70 is used, a plurality of battery cells in the battery pack 50 which are completed with charge are sequentially used so that the battery drill 70 can continuously operate. To this end, the battery charger 10 in this embodiment is set up to be capable of charging the battery pack 50 quickly in about 20 minutes.

Figure 4:
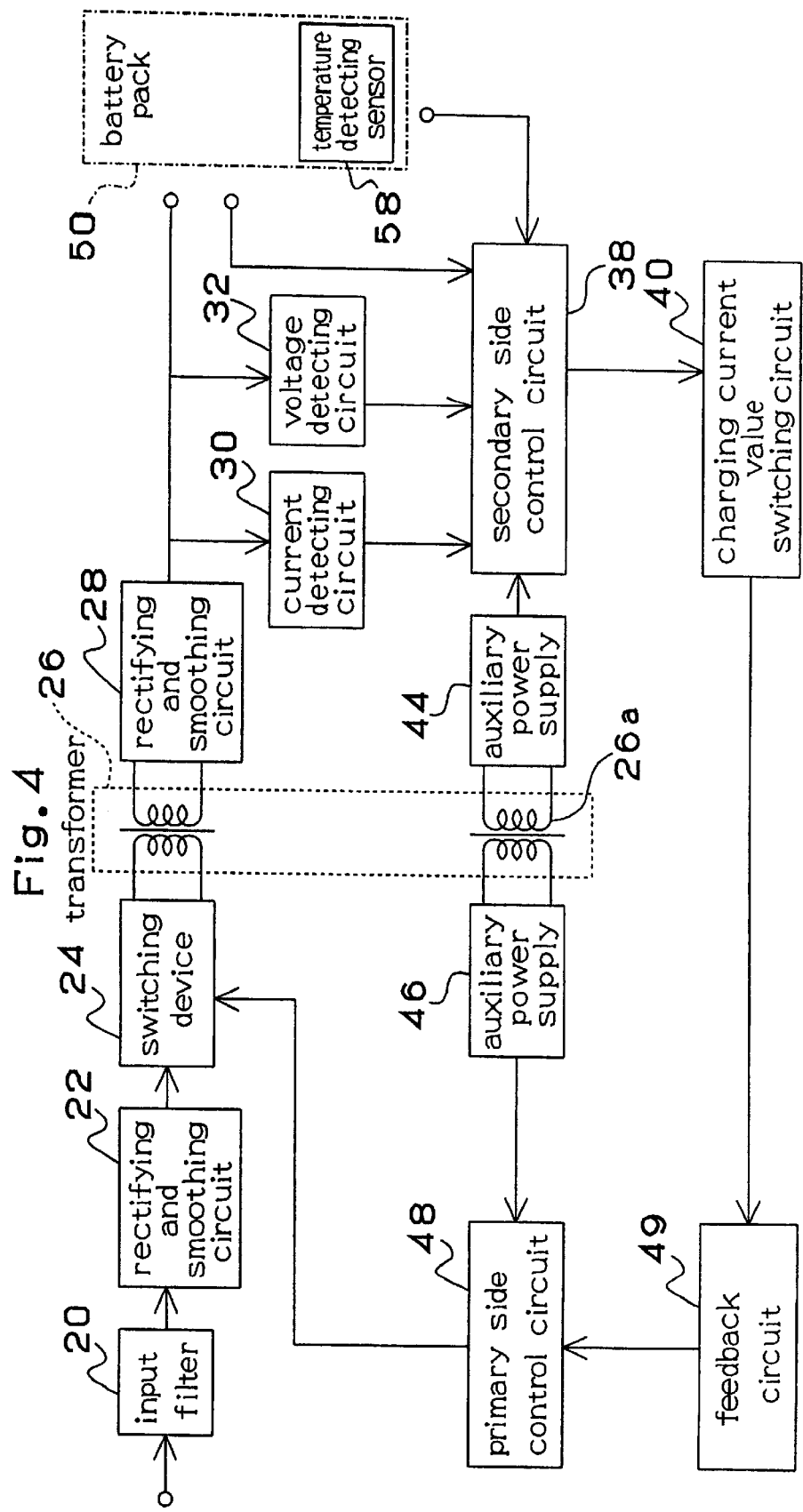
FIG. 4 is a block diagram showing a charging circuit in the battery charger shown in FIG. 1.

FIG. 4 is a circuit arrangement within the battery charger 10. In the circuit shown in FIG. 4, the noise of a commercial AC power supply is removed by an input filter 20, the AC power is rectified and smoothed by a rectifying and smoothing circuit 22 and switched on and off by a switching device 24 provided between the rectifying and smoothing circuit 22 and a transformer 26. The transformer 26 is provided with an auxiliary winding 26a from which an electromotive force is inputted into an auxiliary power supply 46 and applied to a primary side control circuit 48. The primary side control circuit 48 is provided for on/off controlling the switching device 24. The switching device 24 controls a duty ratio of charging current and the transformer 26 decreases commercial AC power voltage to a suitable voltage level.

The output of the transformer 26 is rectified and smoothed by the rectifying and smoothing circuit 28 and then applied to the battery pack 50. By doing so, the battery cell (not shown) contained in the battery pack 50 is applied with charging current. A current detecting circuit 30 and a voltage detecting circuit 32 are connected between the rectifying and smoothing circuit 28 and the battery pack, from which a charging current signal and a charging voltage signal are inputted to a secondary side control circuit 38, respectively. A temperature signal from a temperature detecting sensor 58 provided within the battery pack is inputted into the secondary side control circuit 38.

A power supply from an auxiliary power supply circuit 44 is applied to the secondary side control circuit 38. The secondary side control circuit 38 stores a current value control map to be described later, obtains a temperature rise value by differentiating a temperature value outputted from the temperature detecting sensor 58, retrieves the map based on the temperature value and the temperature rise value and obtains an allowable current value with which a battery can be charged while suppressing the battery temperature from rising. The secondary side control circuit 38 then determines whether or not a duty ratio is to be increased based on the above-stated charging current signal and transmits the duty ratio to the primary side control circuit 48 through a charging current value switching circuit 40 and a feedback circuit 49, accordingly.

The constitution of the map for use in current control as stated above will be described with reference to FIG. 5.

Normally, if charging current for a battery increases, charging time becomes shorter and temperature rise becomes larger. Conversely, if charging current decreases, charging time becomes longer and temperature rise becomes smaller. A nickel metal hydride battery, in particular, has characteristics that a temperature gradient (temperature rise value) varies greatly with charging current and the already charged capacity. Due to this, in this embodiment, battery charge is conducted while changing current values so as to suppress temperature rise. In other words, the conventional battery charger charges a battery with a fixed current value, whereas the battery charger in this embodiment determines the state of a battery based on the absolute temperature and a temperature rise value and charges the battery while changing current values as high as possible with which the temperature rise of the battery can be suppressed, that is, while changing current values according to the state of the battery.

In this embodiment, if battery temperature is high, relatively low charging current is applied to the battery. If the battery temperature is low, relatively high charging current is applied to the battery. Also, if temperature rise is large, relatively low charging current is applied to the battery. If temperature rise is small, relatively high charging current is applied to the battery.

The map M is intended to conduct variable-control for current as stated above and to specify an optimum current value. In the map, the horizontal axis indicates the absolute temperature T of a battery and the vertical axis indicates a change in temperature dT/dt. Namely, if battery temperature is high and temperature rise is large (lower right in the map), relatively low charging current (1C: current to be charged in one hour) is applied to the battery. If battery temperature is high and temperature rise is small (upper right in the map), medium charging current (2C to 3C) is applied to the battery. If battery temperature is low and temperature rise is large (lower left in the map), medium charging current (2C to 3C) is applied to the battery. If battery temperature is low and temperature rise is small (upper left in the map), relatively high charging current (4C: current to be charged in a ¼ hour) is applied to the battery. In short, optimum current values are set in the respective regions in the map in order to satisfy both target charging time (about 20 minutes) and a target temperature which the battery reaches.

If a battery is charged with high current at low temperature (0° C. or lower), the performance of the battery deteriorates. Due to this, it is desirable to set low current values in the left row of the map in order not to deteriorate battery performance.

A suited region is retrieved from the absolute temperature T of the battery and a change in temperature dT/dt during battery charge based on this map. Charging current is then controlled based on a current value specified in the region. For instance, if battery temperature is between T2 and T3 and a change in battery temperature (or a temperature rise value) is between X1 and X2, then a current value 2C is outputted.

Furthermore, the battery charger in this embodiment detects the completion of battery charge based on the movement of regions in the map. That is, the battery charger according to the conventional technique detects the completion of battery charge by monitoring either temperature or voltage while charging current is set at a fixed level. More specifically, the conventional battery charger detects a temperature rise value, a change in voltage and the decrease of voltage after the battery is fully charged, thereby determining that the battery is fully charged. In the battery charger in this embodiment, by contrast, charging current is changed as stated above. Due to this, the battery charger in this embodiment cannot detect the completion of battery charge only by monitoring a temperature and a change in temperature or a voltage value and a change in voltage. In this embodiment, therefore, the battery charger detects the completion of battery charge based on the movement of the regions in the map.

While a battery is being charged, the charging current value moves apparently at random in the regions of the map according to the change of the temperature value and that of the temperature rise value. Namely, before the battery is fully charged, if temperature increases or temperature rise increases and a relatively small charging current region is selected, that is, if the lower right region in the map shown in FIG. 5 is selected, then temperature rise becomes smaller from the decrease of current and a charging current value corresponds to that in upper regions on the map.

However, as the battery is close to a fully charged state, a temperature rise value increases due to the characteristics of the nickel metal hydride battery. That is to say, while a lower region in the map is selected because of large temperature rise and relatively low current is applied to the battery, temperature rise remains large. Based on this principle, the battery charger in this embodiment makes measurements in a predetermined cycle (e.g., several hundred seconds' cycle). In case of regions (X3~–~T1, X3~–T1~T2, X3~–T2~T3, X3~–T3~) in which temperature rise is large and a region (X2~X3–T3~) in which temperature is high and temperature rise is medium, as hatched in the map, 2 is added as a count value for determining the completion of charge. In case of a region (X1~X2–T3~) in which temperature is high and temperature rise is medium and a region (X2~X3–T2~T3), as meshed in the map, 1 is added as a count value for determining the completion of charge. If the addition value amounts to 6, it is determined that battery charge is completed and battery charge is stopped.

The battery charge of the battery charger in this embodiment will be described in more detail with reference to a graph of FIG. 6 as well as the map M of FIG. 5.

Figure 6:
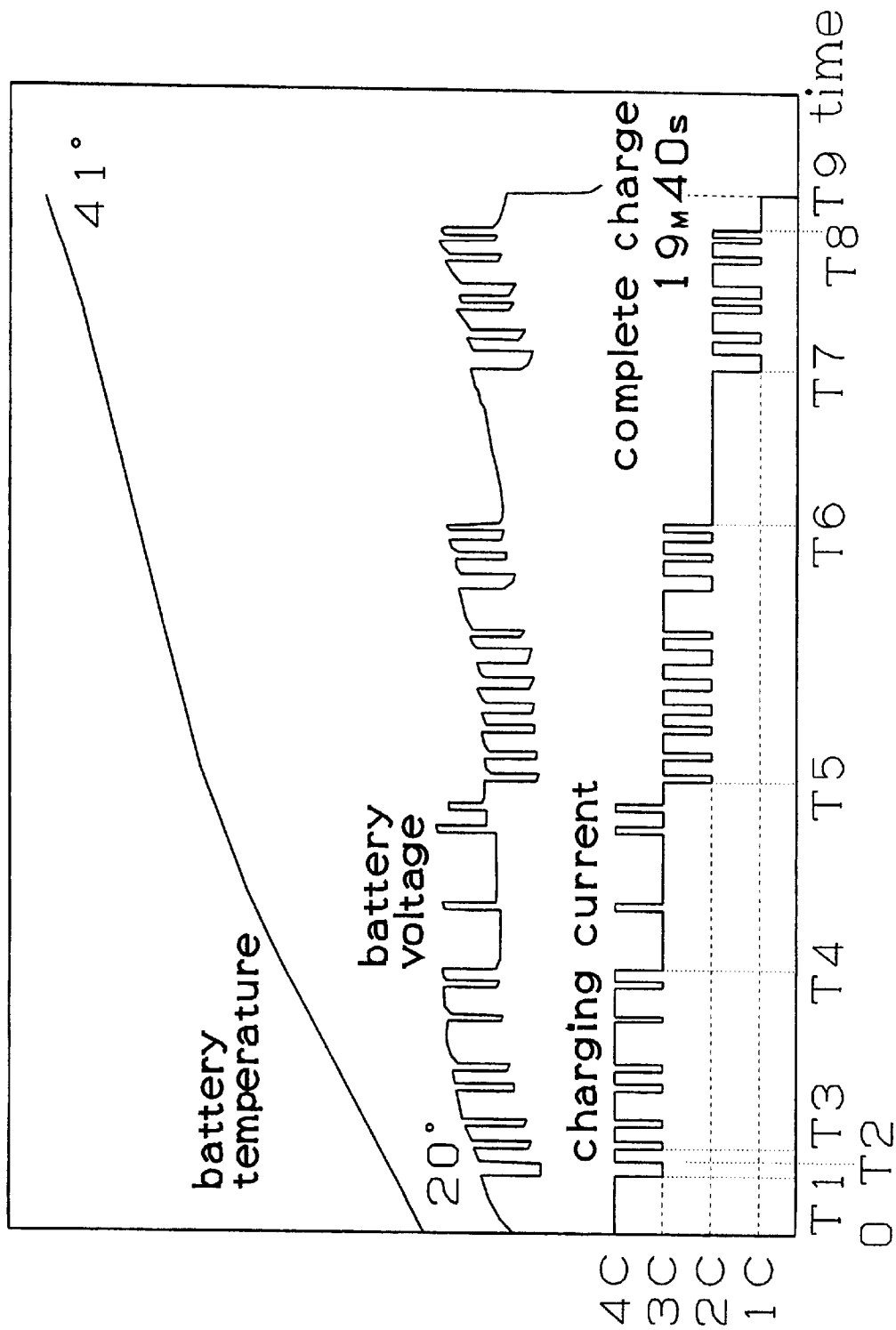
FIG. 6 is a graph showing changes in battery voltage, battery temperature and charging current in case of controlling current in accordance with the map without making any corrections.

In FIG. 6, the horizontal axis indicates charging time and the vertical axis indicates charging current, battery voltage and battery temperature.

As shown therein, from the start of charge (time 0) to time T1, battery temperature is low (T1~T2) and temperature rise is small (~X1), so that maximum current 4C is selected. As the battery is charged with high current, temperature rise slightly increases (X1~X2) and current is switched to slightly high current 3C (at time T1). Temperature rise becomes smaller (~X1) due to decreased current and, at time T2, the battery is charged with the maximum current 4C again. At time T3, current is switched to slightly high current 3C again. After repeating switching current between 4C and 3C, the battery is charged mainly with 3C from T4 in a medium charging period following battery temperature rise. From time T5, as temperature rises further, battery charge is continued with current switched between 3C and 2C. From time T6, the battery is charged with slightly low current 2C. From time 7 in a final charging period, battery charge is conducted with current switched between 2C and 1C. From time T8 to time T9, the battery is charged with the minimum current 1C. As stated above, based on the determination of regions of the map M, the completion of charge is detected and battery charge is completed at time T9. In this way, the map is retrieved based on battery temperature and a battery rise value, an allowable current value with which the battery can be charged while the temperature rise of the battery is being suppressed, and the battery is charged with the obtained allowable current value. Thus, it is possible to charge a nickel metal hydride battery in a short time which temperature tends to rise during charge, without causing deterioration due to temperature rise.

Figure 7:
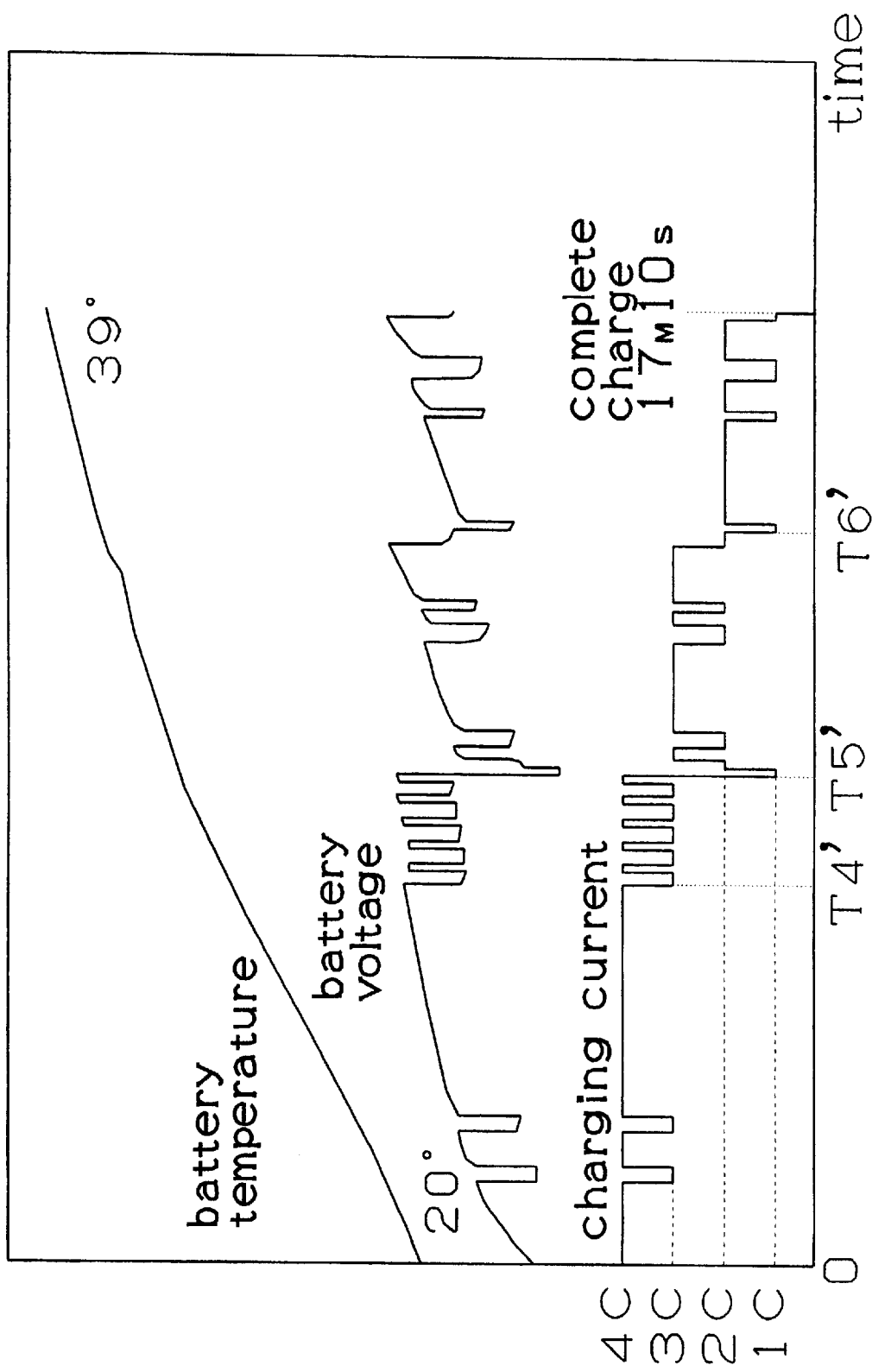
FIG. 7 is a graph showing changes in battery temperature, battery voltage and charging current in case of making control by the charging circuit in the first embodiment.

It is noted that FIG. 6 is a graph, for comparison purposes, showing that charging current is controlled without correcting data (a change in temperature dT/dt) for retrieving the map M. FIG. 7 is a graph showing that charging current is controlled by the battery charger in this embodiment. That is, the battery charger in this embodiment minimizes the frequency of switching charging current by correcting data (a change in temperature dT/dt) for retrieving the map M.

The difference between correction being made and no correction being made will be described in more detail with reference to FIGS. 6 and 7. In a case where no correction is made as shown in FIG. 6, current is frequently switched from time T0 to time T4 and from time T5 to time T6. In a case where correction is made as in this embodiment, by contrast, the frequency of switching current values is minimized from time T0 to T4' and from time T5' to time T6'. Owing to this, it takes 19 minutes and 40 seconds to complete battery charge and the battery temperature rise up to 41° C. in the example shown in FIG. 6, whereas it takes 17 minutes and 10 seconds to charge the battery and the battery temperature is 39° C. at the time of the completion of charge in the battery charger in this embodiment as shown in FIG. 7. It should be noted that battery charge is stopped after detecting that battery capacity is 95% based on the change of battery temperature, so that negative dV/dt (voltage decrease) does not occur in the final charging period as seen in FIG. 6.

Correction stated above means that the battery charger corrects a change in temperature if the battery charger determines that battery is not in the final charging period, i.e., the battery state is in the initial and medium charging periods. The battery charger in this embodiment determines the battery state based on the change of battery voltage. In that case, since the battery is charged while switching current values, it is impossible to determine the charging state simply based on the change of battery voltage. For instance, a charging current of 4C and that of 3C greatly differs in voltage increase pattern, so that they cannot be compared with each other. Taking this into consideration, the battery charger in this embodiment determines the charging state by comparing values with the same current value switching pattern.

The determination method will be described in more detail with reference to FIG. 10.

The battery charger in this embodiment employs four types of charging currents, i.e., 1C through 4C and has 12 types of current change patterns, i.e., 1C→2C, 1C→3C, 1C→4C, 2C→3C . . . 3C→2C, 2C→1C. Therefore, when charging current is changed for every pattern final battery voltages and time are stored and the present final battery voltage and the past final battery voltage with the same pattern are compared with each other.

FIG. 10A shows changes in battery voltage and charging current from the start of battery charge to the medium charging period, and FIG. 10B shows changes in battery voltage and charging current from the final charging period to the completion of battery. As shown in FIG. 10A, in the initial charging period, the battery voltage macroscopically increases gradually and it microscopically changes up and down as charging current is changed based on the battery temperature. For instance, at time t2 when charging current is switched from 4C to 3C, battery voltage decreases momentarily.

In the graph of FIG. 10A, when the charging current is switched from 4C to 3C, from 3C to 4C, 2C to 3C and 3C to 2C final values are denoted by ∆, □, ○ and ◊, respectively. The battery charger in this embodiment determines the battery charged state by comparing final values ∆ (4C→3C), □ (3C→4C), ○ (2C→3C) and ◊ (3C→2C), respectively.

In FIG. 10A, for instance, during battery charge with a current of 3C after charging current is switched from 4C to 3C, the final voltage value V1 and time t1 are stored just before the current value is switched again. The stored data (the final voltage value V1 and time t1) are compared with the final voltage value V3 and time t3 just before the current value is switched again during battery charge with a current of 3C after the charging current is switched from 4C to 3C of the same pattern. A change in battery voltage dV/dt is expressed by the following expression:

$$dV/dt = (V3-V1)/(t3-t1)$$

The battery charged state is determined by comparing the calculated change in battery voltage with a preset value. If battery voltage increase is large, the battery charger determines that the battery state is in an initial charging period and, as described above with reference to FIG. 7, retrieves the map M using the corrected value to thereby suppress the switching of the current values.

The final voltage value V3 and time t3 after charging current is changed from 4C to 3C stated above, is stored until the same change pattern of charging current appears. Then, the final voltage value V7 and time t7 after the charging current is switched from 4C to 3C with the same pattern are compared with the stored data (the final voltage value V3 and time t3). A change in battery voltage dV/dt at this time is expressed by the following expression:

$$dV/dt = (V7-V3)/(t7-t3)$$

The above description concerns processings in a case where charging current is switched from 4C to 3C (4C→3C) denoted by ∆. Likewise, the battery charger determines the battery charged state by comparing data on □ (3C→4C), ○ (2C→3C) and ◊ (3C→2C), respectively. At voltage values V1, V3, V7 and V11 denoted by ∆ and at V5, V9 and V13 denoted by ○, the same charging current of 3C is applied. However, the current value before switched to 3C is 4C for ∆ and 2C for ○. The data on ∆ and that on ○ differ from each other in pattern. In short, the manner of battery voltage increase completely differs between battery charge with 4C and that with 2C and they are, therefore, regarded as different data.

FIG. 10B shows changes in battery voltage and charging current from the final charging period to the charge completion period. In the charge completion period, the battery voltage shows gradual decrease macroscopically. Microscopically, however, it shows increase and decrease repeatedly.

In the graph of FIG. 10B, final values when charging current is switched from 3C to 2C, 2C to 3C, 1C to 2C and 2C to 1C are denoted by ∇, ■, ● and ◆, respectively. The battery charger in this embodiment compares data on ∇

(3C→2C), that on ■ (2C→3C), ● (1C→2C) and ♦ (2C→1C), respectively and determines the battery charged state based on their respective battery voltage decrease values.

That is to say, the battery charger in this embodiment switches charging current between 4C and 1C (4C→1C) while measuring battery temperature using the map M. The battery charger then detects final battery voltages (○,△, □, ◇, ▽, ■, ●, ♦) for charging current change patterns and compares the changes, respectively. This is because voltage varies with the switching of charging current as stated above and it is, therefore, impossible to determine the battery state simply from voltage values. While the charging current is being switched, detected voltage values and changes in voltage appear to be random. If the obtained data are seen as a probability distribution, they have the same characteristics as those of constant-current charge macroscopically. In other words, if a change in voltage dV/dt is detected for every current change pattern while the battery capacity is close to 0%, dV/dt is a high positive value (battery voltage increase is large) in the initial charging period and gradually decreases from the medium charging period. If the battery capacity is close to 100%, dV/dt becomes a high positive value again. If the battery is fully charged, dV/dt turns negative. That is, even if battery charge is conducted while switching current values, ordinary voltage change characteristics as shown in the constant-current charge according to the conventional technique are seen. The battery charger in this embodiment detects final battery voltages (○, △, □, ◇, ▽, ■, ●, ♦) and compares their changes, respectively, thereby obtaining battery voltage change characteristics and estimating the residual capacity.

The specific processings by the battery charger in this embodiment will be described with reference to the flow charts of FIGS. 8 and 9.

When battery charge starts, the secondary side control circuit 38 (see FIG. 4) in the battery charger adjusts charging current and determines whether battery charge is completed in a predetermined cycle (in this case, a 100-second cycle for convenience; actually a shorter cycle, i.e., a 10-second cycle). First, battery temperature is detected (in a step S12) and a change in battery temperature is detected by differentiating the detected temperature (in a step S14). Then, battery voltage is detected (in a step S16).

Next, the final battery voltage value of the same current change pattern is called (in a step S18) and current switch time of the same current change pattern is called (in a step S20). For instance, if the present time is t2' in FIG. 10A and the current change pattern is 4C→3C, the previous final battery voltage V1 and switch time t1 of the current change pattern of 4C→3C are called. The detected battery voltage (in this case, a battery voltage of V2' at a time t2') is updated as the final battery voltage value of the current change pattern of this time (in a step S22).

Thereafter, a change in final battery voltage value dV/dt between the previous and present values of the same current change pattern is calculated (in a step S24). The change in battery voltage dV/dt is calculated from the following expression:

$$dV/dt=(V2'-V1)/(t2'-t1)$$

Then, the range Va~Vb of the change in voltage for shortening battery charge time optimum for the current change pattern of this time is set (in a step S26). That is, as stated above, in the initial and medium charging periods, charging time is shortened by correcting a temperature change value for use in retrieval of the map M. Due to this, a range for determining that the battery state is in the initial charging period or in the medium charging period is set. Since the battery pack 50 employs voltages of 14.4 V, 12 V and 9.6 V depending on the number of battery cells as already stated, the range is set according to their respective voltages.

Further, a lower limit voltage change value Vc (negative value) for full charge detection, which is optimum for the current change pattern of this time, is set (in a step S28). Namely, as stated above with reference to FIG. 10B, a change in battery voltage for full charge detection is set. The value is set individually because the battery pack 50 adopts voltages of 14.4 V, 12 V and 9.6 V depending on the number of battery cells as described above.

Next, it is determined whether or not the change in voltage dV/dt calculated in the step S24 falls within the range of Va<dV/dt<Vb, that is, whether the battery state is in the initial or medium charging period (in a step S30). In this case, if the battery state is in the initial or medium charging period ('Yes' in S30), it is determined whether charging rate is high (4C or 3C) or low (2C or 1C) (in a step S32). If the charging rate is high (4C or 3C), the processing goes to a step S34. In the step S34, correction is made so as to decrease a change in battery temperature, as described above. In a step S40, the optimum charging current map M shown in FIG. 5 is retrieved to thereby determine the optimum charging current of 4C or 3C (in a step S42). On the other hand, if the charging rate is low (2C or 1C), no correction is made and, in a step S40, the optimum charging current map M is retrieved to thereby determine the optimum charging current (in a step S42).

Figure 8:
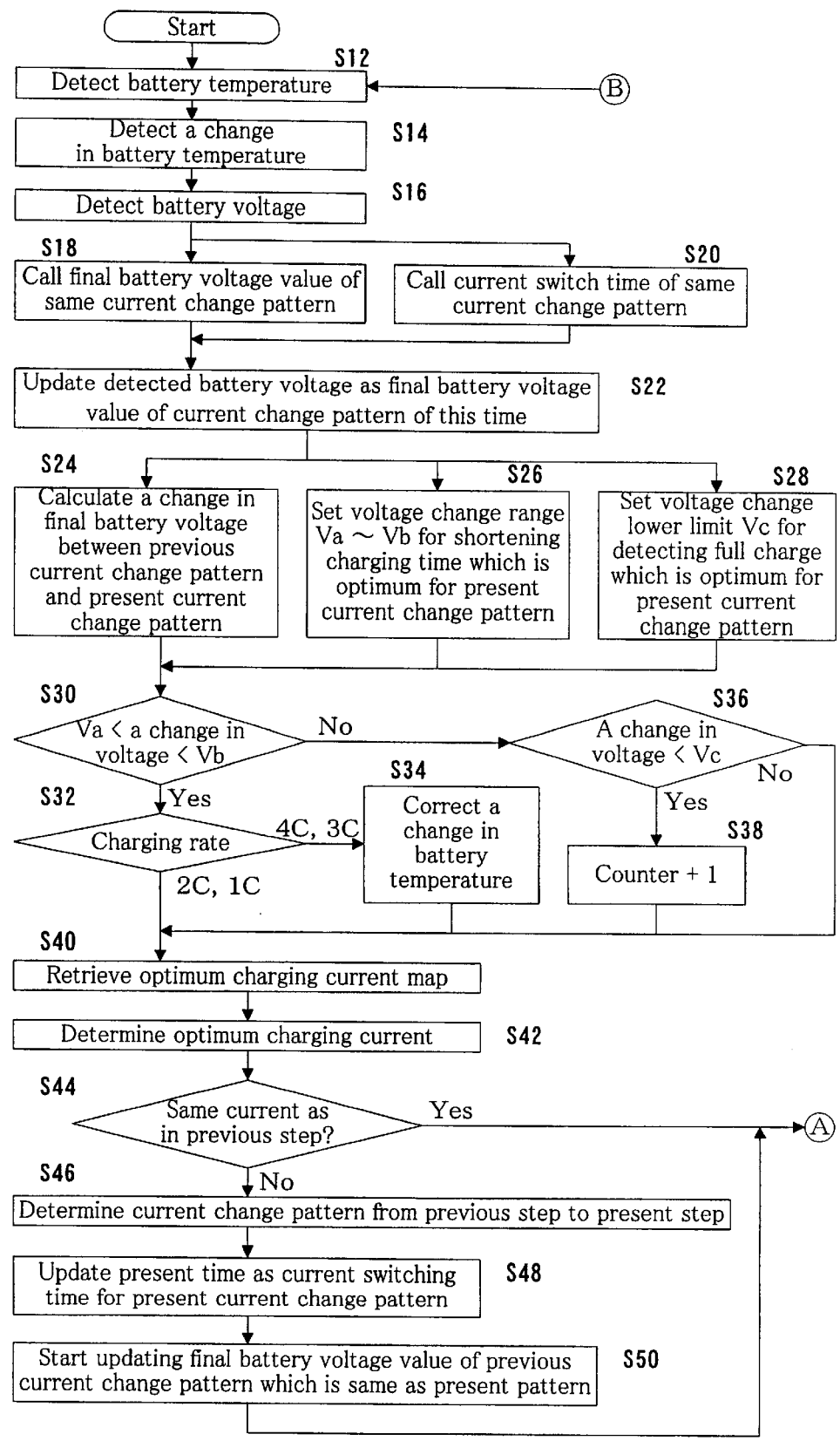
FIG. 8 is the first half of a flow chart showing processing of the charging circuit in the first embodiment.
Figure 9:
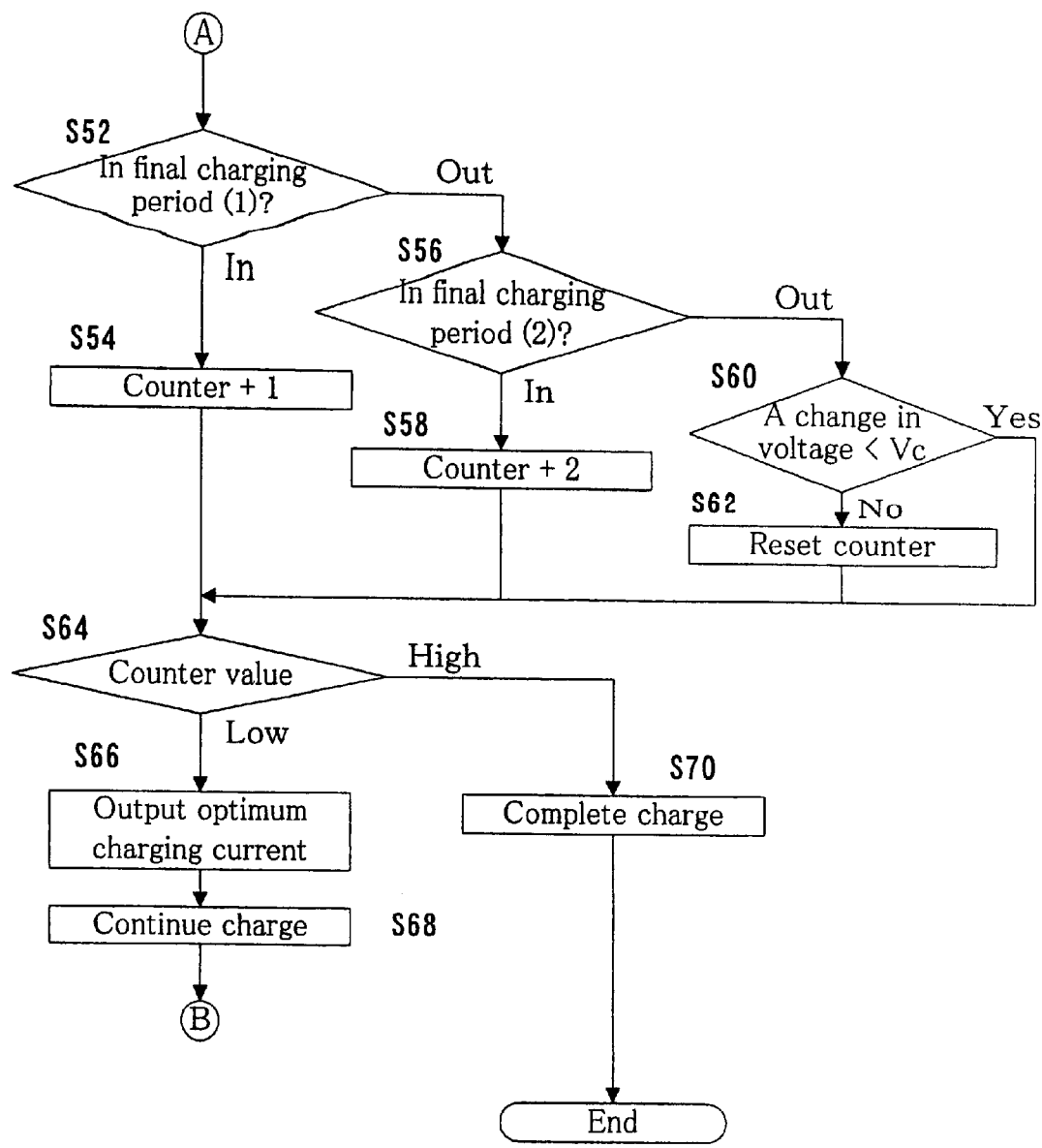
FIG. 9 is the second half of the flow chart showing processing of the charging circuit in the first embodiment.

In the battery charger in this embodiment, if it is estimated that the residual capacity is low, i.e., before the final charging period, the data value (change in temperature dT/dt) for use in retrieval of the map M stated above is corrected to low, thereby minimizing the frequency of switching charging current and shortening charge time as stated with reference to FIG. 8. Whether the residual capacity is low (about 20 to 60%) or not is estimated by determining whether or not dV/dt for every current change pattern falls within a predetermined range as described above. It is noted that even with a relatively new battery which is used less frequently, if the residual capacity is low at an ordinary temperature, there is a high probability that a high charging current (3C, 4C) is selected based on the map. In this case, correction is made as in the case of the above to thereby minimize the frequency of switching charging current.

In the intervening time, in the step S30 described above, if a change in temperature falls within the range of Va<dV/dt<Vb, i.e., the determination result as to whether the battery state is in the initial charging state or medium charging state is No, the processing then goes to a step S36. In the step S36, it is determined whether a change in voltage dV/dt is less than Vc which is set in the step S28 or whether the battery state is in the final charging period. If the battery is determined as being in the final period ('Yes' in the step S36), the counter for determining charge completion is incremented by 1 (in a step S38).

Thereafter, it is determined whether the current is the same as that in the previous step (in a step S44). Here, if current is switched, for example, from 3C to 2C ('No' in the step S44), the current change pattern from the previous step to the present step is determined (in a step S46). For instance, if current is switched from 3C to 2C at time t3, the change pattern is determined as 4C→3C which is a pattern prior to the current switch of 3C to 2C. Then, the present time is updated as current switch time for the current change pattern of this time (in a step S48). In this embodiment, time t3 at which current is switched from 3C to 2C is stored as a final value. In addition, the update of the previous final battery voltage value of the same current change pattern as that for the present value is started (in a step S50). In this embodiment, the battery voltage value V3 at time t3 at which current is switched from 3C to 2C, is stored as a final value and the update of this value is started. That is to say, the last values (time t3, voltage V3) of the change pattern of 4C→3C denoted by Δ shown in FIG. 10A are retained and used as reference values at the time of detecting a change in battery voltage at times t6 to t7 at which the pattern α appears next time.

Figure 5:
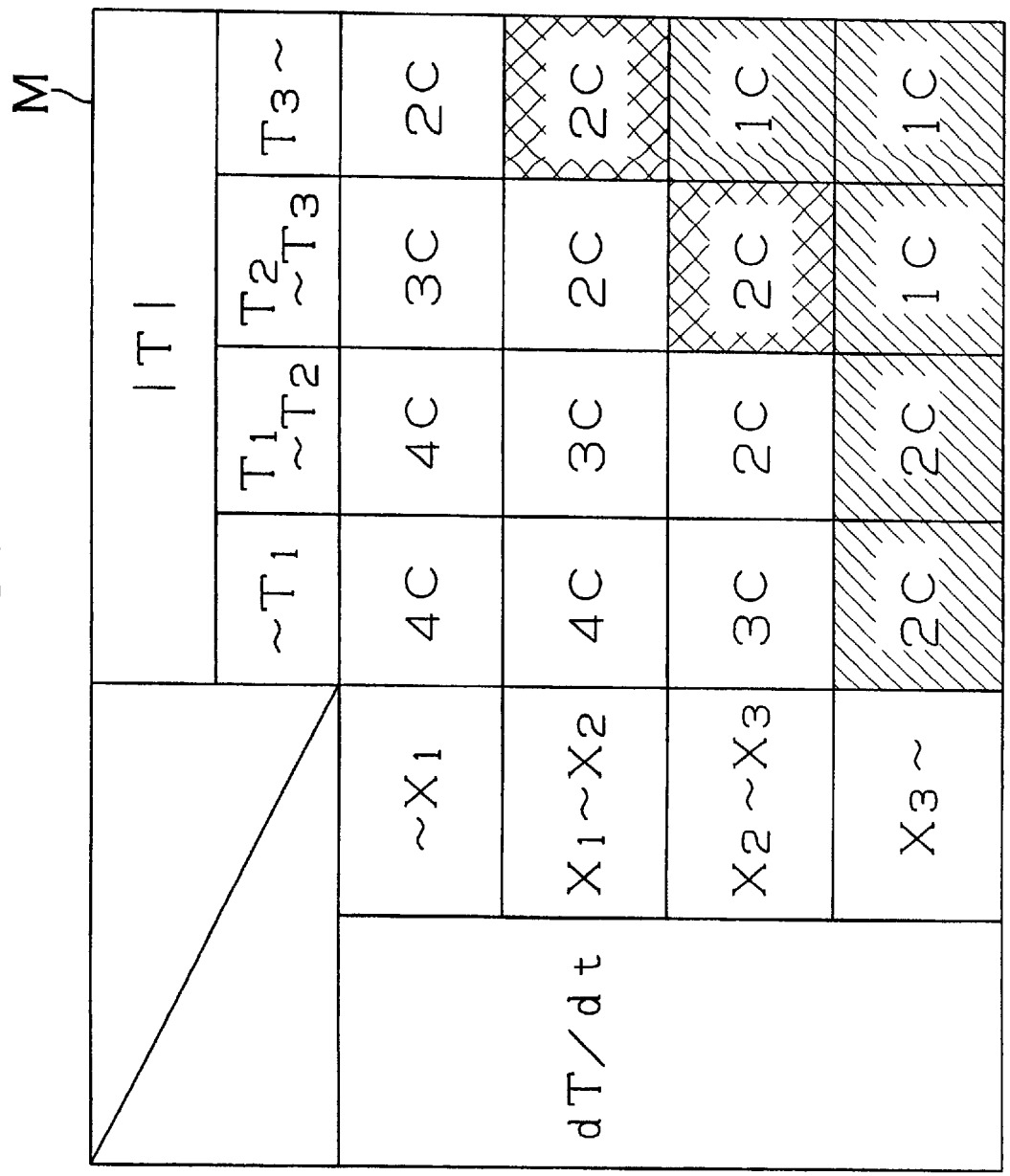
FIG. 5 is an explanatory view indicating the content of a map retained in the charging circuit in the first embodiment.

On the other hand, if there is no change in current ('Yes' in the step S44), it is determined whether the present temperature value T and a change in temperature dT/dt of present belong to the regions (X1~X2–T3~) in which temperature is high and temperature rise is medium and the region (X2~X3–T2~T3) in which temperature is relatively high and temperature rise is medium as meshed in FIG. 5, that is, whether they belong to the final charging period region(1). Then, if they belong to the final charging period region(1), the counter for determining the charge completion is incremented by 1 (in a step S54). If they do not belong to the final charging period region (1), it is then determined whether they belong to the regions (X3~—T1, X3~—T1~T2, X3~—T2~T3, X3~—T3~) in which temperature rise is large and the region (X2~X3–T3~) in which temperature is high and temperature rise is medium as hatched in the map M of FIG. 5, that is, whether they belong to the final charging period region (2) (in a step S56). If they belong to the final charging period region (2), the counter for determining charge completion is incremented by 2 (in a step S58).

On the other hand, if they do not belong to the final charging period region (1) or (2), it is then determined whether a change in voltage dV/dt is less than Vc in a step S60. If dV/dt is not less than Vc ('No' in the step S60), the counter is reset even though the present temperature value T and a change in temperature dT/dt of present belong to the final charging period region (1) or (2) (in a step S62). If dV/dt is less than Vc ('Yes' in the step S60), the processing goes to a step S64 and continues.

It is determined whether the counter value exceeds a predetermined value (e.g., 6) (in a step S64). Here, optimum charging current is outputted until the counter value reaches the predetermined value (i.e., 'Low' in the step S64) (in a step S66) and battery charge is continued (in a step S68). That is, the processing returns to the step S12. If the counter value reaches the predetermined value ('High' in the step S64), battery charge is completed (in a step S70).

In the battery charger in this embodiment, as described above with reference to FIG. 10B, if the battery capacity becomes 100%, the probability that dV/dt is gradually close to a negative value (or voltage decreases) increases. Therefore, if dV/dt is lower than the set lower limit value Vc (negative), the counter for determining battery completion is incremented by 1. At the same time, it is determined whether dV/dt belongs to the final charging period region (1) and (2) detected from battery temperature and the change in temperature. This makes it possible to further ensure detecting that full charge is completed. In addition, by making determination based on voltage and temperature, it is possible to appropriately determine battery completion at a time of charging a battery which capacity is close to full, charging a battery which is left for a long time and which capacity is zero (in which case the increase of dT/dt tends to be slow in the final charging period) or when a change in battery temperature is difficult to detect due to the large difference between battery temperature and environmental temperature (such as, for example, when battery temperature is high, environmental temperature is low and the battery is cooled by the outside air).

Furthermore, in this battery charger, even if temperature resolution is low, it is possible to stabilize control over battery charge and to complete battery charge in a short time by correcting an input value and then retrieving the map. Besides, appropriate control can be made without the need to provide many regions in the map, so that an apparatus can be realized with a small storage memory. Hence, the battery charger can be advantageously manufactured at low cost.

Figure 11:
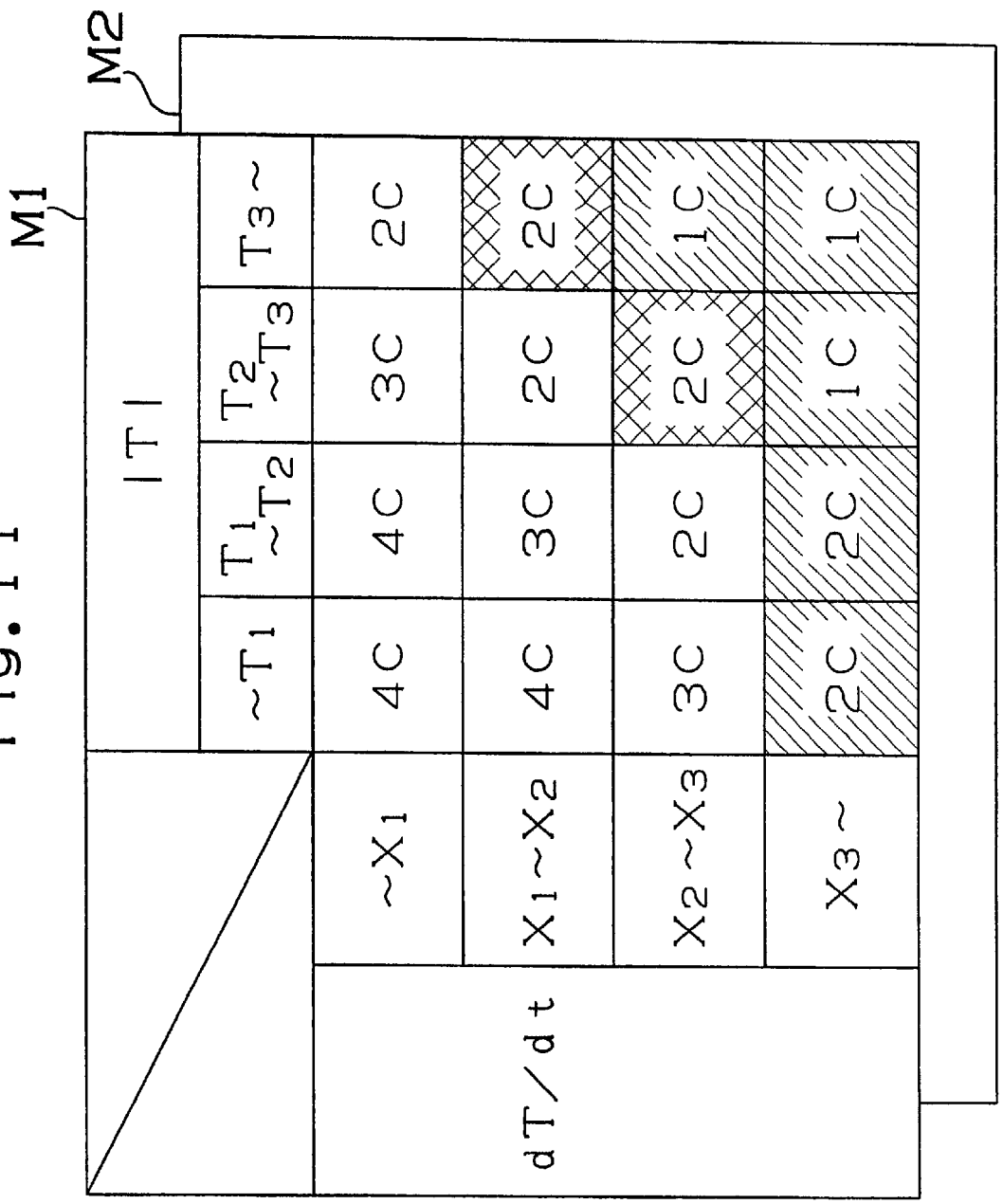
FIG. 11 is an explanatory view showing the contents of maps retained in a charging circuit in the second embodiment.
Figure 12:
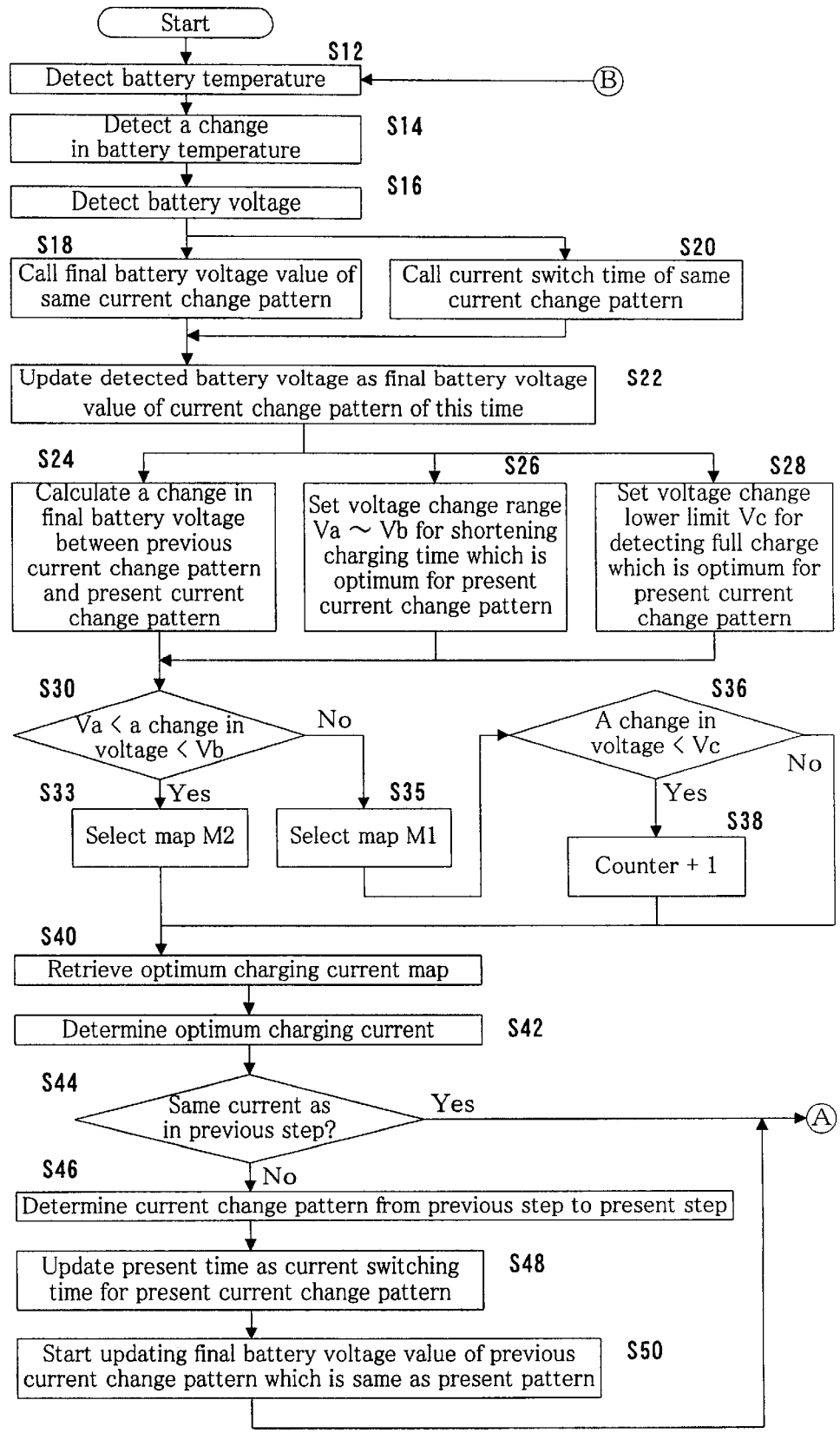
FIG. 12 is the first half of a flow chart showing processing of the charging circuit in the second embodiment.

Next, the battery charger in the second embodiment will be described with reference to FIGS. 11 and 12. It is noted that the circuit arrangement of the battery charger in the second embodiment is the same as that in the first embodiment described with reference to FIG. 4. No description will be, therefore, given herein to the circuit arrangement.

In the first embodiment described above, optimum battery charge is conducted by correcting and using a single map shown in FIG. 5, irrespective of the battery charged state. The battery charger in the second embodiment, by contrast, employs two types of maps, a map M1 for initial and medium charging periods and a map M2 for a final charging period shown in FIG. 11, detects the battery charged state based on the battery voltage, switches maps and thereby conducts optimum battery charge.

The processings by the battery charge in the second embodiment will be described with reference to the flow chart of FIG. 12. The processings from steps S12 to S30 in FIG. 12 are the same as those in the first embodiment which have been described with reference to FIG. 8. In a step S30, it is determined whether the battery charged state is in the initial or medium charging period based on a change in voltage. If the battery charged state is in the initial or medium charging period ('No' in the step S30), the processing goes to a step S35 where the map M1 for the initial and medium charging periods is selected. On the other hand, if the battery charged state is in the final charging period ('Yes' in the step S30), the processing goes to a step S33 where the map M2 for the final charging period is selected. The following processings are the same as those in the first embodiment described above with reference to FIG. 8. Therefore, no description will be given thereto.

Next, the battery charger in the third embodiment according to the present invention will be described with reference to FIGS. 13 and 14. It is noted that the circuit arrangement of the battery charger in the third embodiment is the same as that in the first embodiment described with reference to FIG. 4. Therefore, no description will be given to the circuit arrangement herein.

In the first embodiment above, the battery charger detects the completion of battery charge based on the regions of battery voltage and battery temperature in the map. The battery charger in the third embodiment, by contrast, detects the completion of battery charge only based on battery voltage.

The processings by the battery charger in the third embodiment will be described with reference to FIGS. 13 and 14.

Figure 13:
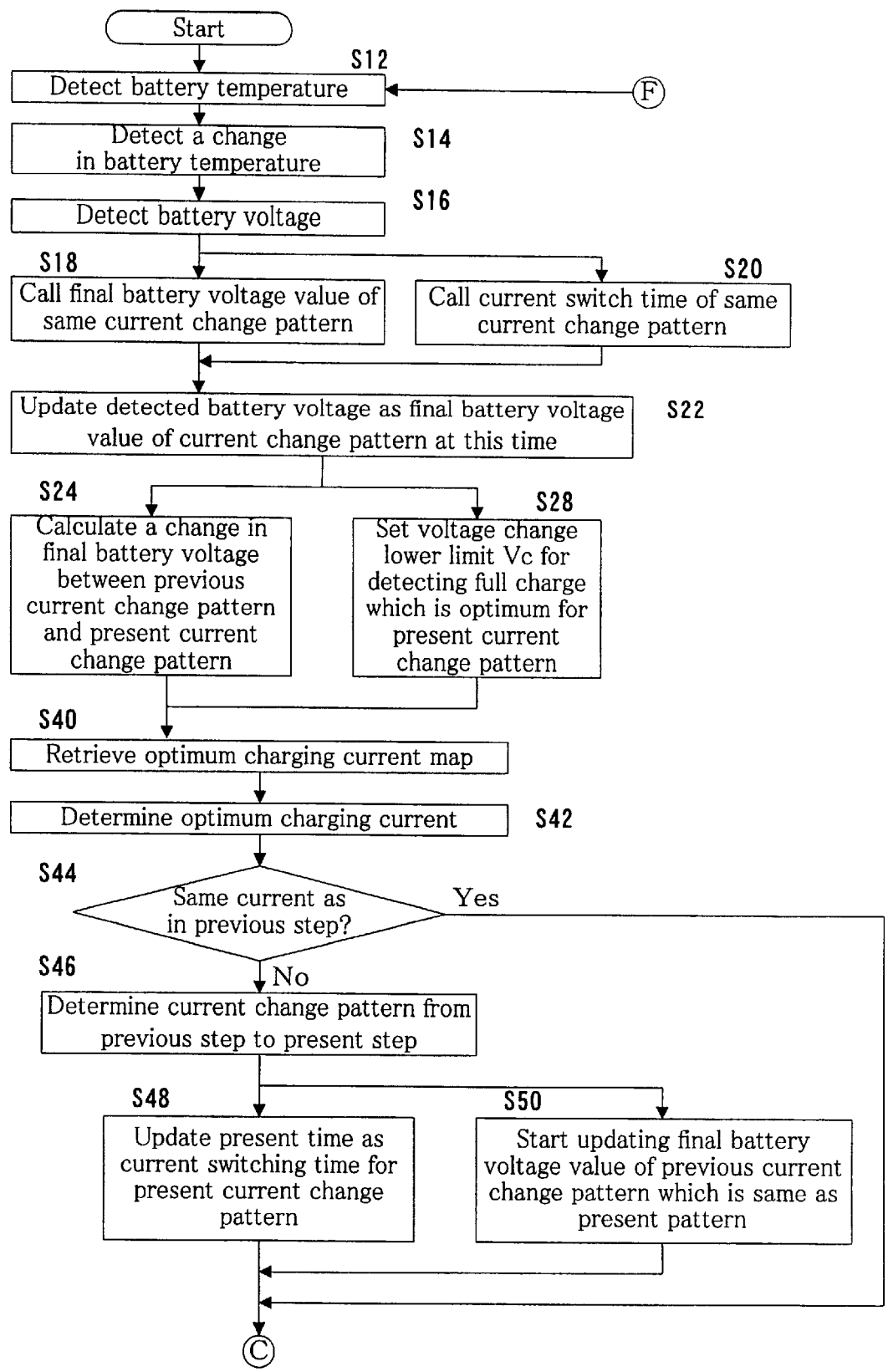
FIG. 13 is the first half of a flow chart showing processing of a charging circuit in the third embodiment.

FIG. 13 shows the first half of the processings in the third embodiment. The processings in steps 12 to 50 in FIG. 13 are the same as those in the first embodiment described above with reference to FIGS. 8 and 9. Therefore, no description will be given thereto.

Figure 14:
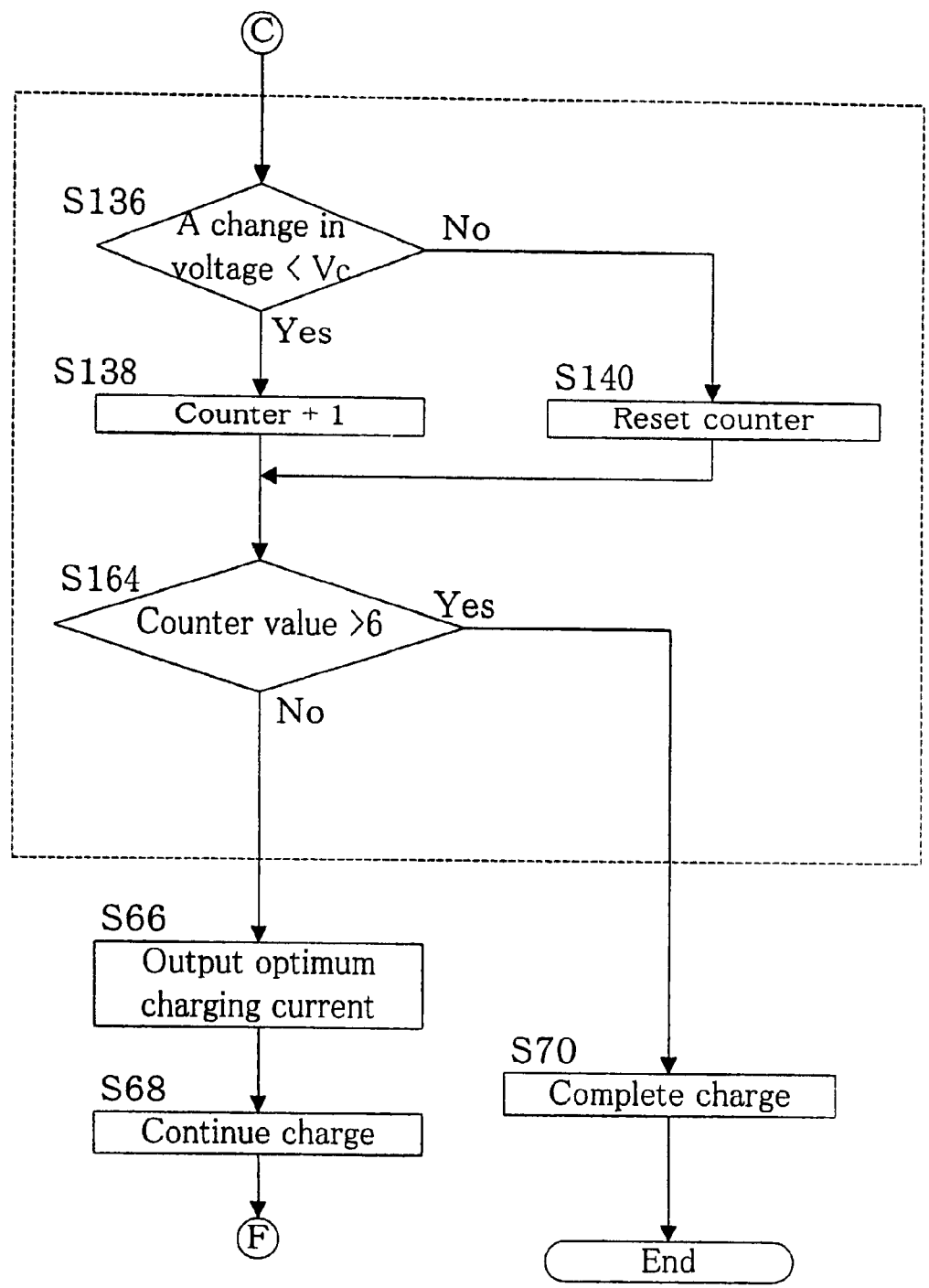
FIG. 14 is the second half of the flow chart showing processing of the charging circuit in the third embodiment.

FIG. 14 shows the second half of the processings for completing battery charge in the third embodiment. In a step S136, it is determined whether a change in voltage dV/dt is less than Vc (a voltage decrease value at the time of full charge) set in the step S28, i.e., whether the battery state is in the final charging period. If it is determined that the battery state is in the final charging period ('Yes' in the step S136), the counter for determining charge completion is incremented by 1 (in a step S138). If it is determined that the battery is not in the final charging period from the change in voltage dV/dt ('No' in the step S136), the counter is reset (in a step S140). Then, if the value of the counter exceeds 6, i.e., it is determined that the battery state is in the final charging period six consecutive times based on changes in dV/dt ('Yes' in the step S164), battery charge is completed (in the step S70). If the value of the counter does not exceed 6 ('No' in the step 164), the processing goes to the step S66 and battery charge is continued.

Next, the battery charger in the fourth embodiment according to the present invention will be described with reference to FIG. 15. In the battery charger in the first embodiment, as described above with reference to FIGS. 8 and 9, if the completion of battery charge is detected based on battery voltage, the counter is incremented by "1" and if the present temperature value T and a change in temperature dT/dt of present belong to the final charging period region (1) based on battery temperature, the counter is incremented by "1" and if they belong to the final charging period region (2), the counter is incremented by "2". That is, the battery charger in the first embodiment give weights for determination based on battery temperature but does not give weights to battery voltage. The battery charger in the third embodiment, by contrast, give weights to both battery temperature and battery voltage and detects completion of battery charge.

The processings by the battery charger in the fourth embodiment will be described with reference to FIG. 15.

Figure 15:
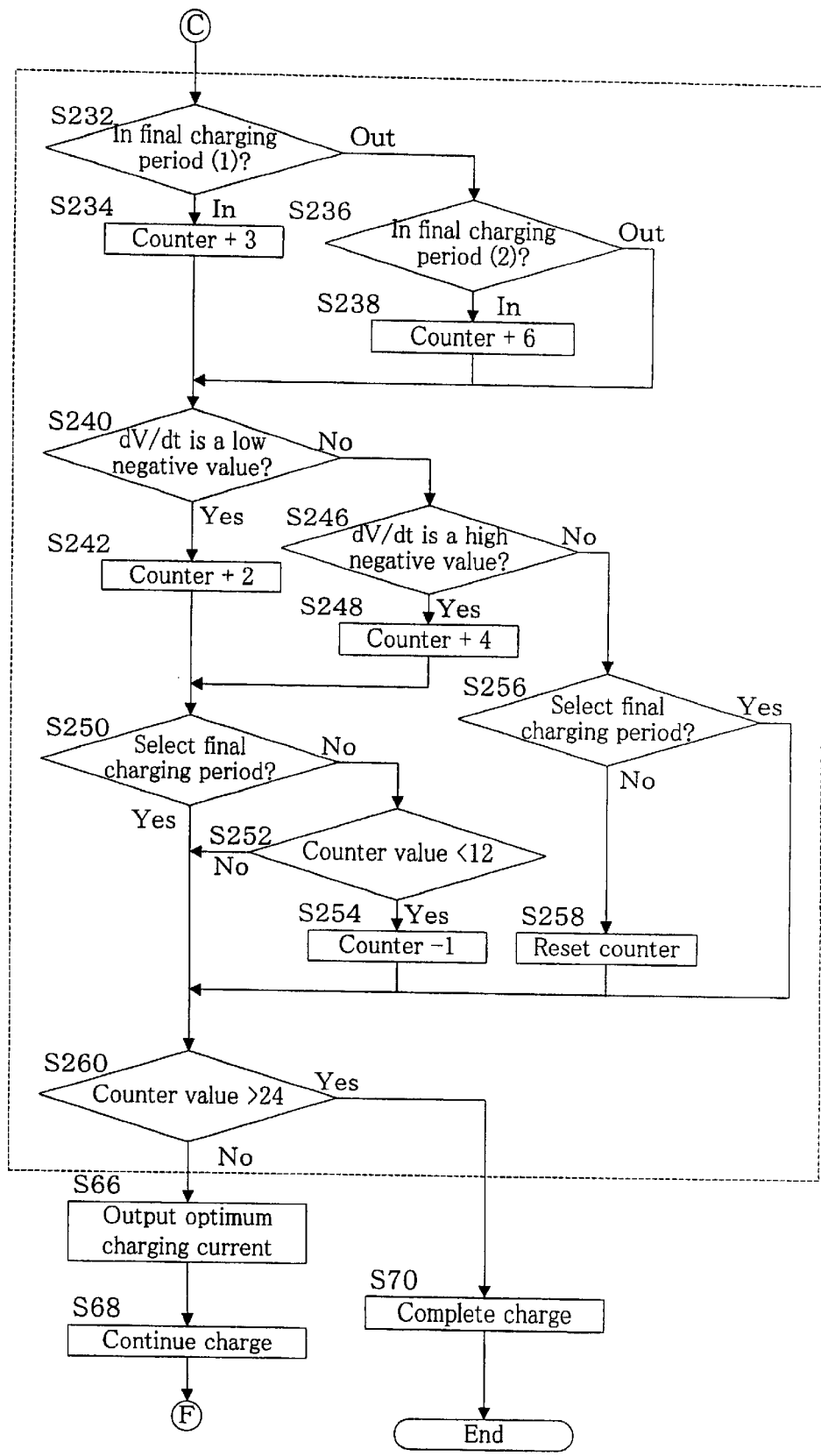
FIG. 15 is the second half of a flow chart showing processing of a charging circuit in the fourth embodiment.

FIG. 15 shows the second half of the processings in the fourth embodiment. Since the first half of the processings in the fourth embodiment are the same as that in the third embodiment described above with reference to FIG. 13, no description will be given thereto.

First, it is determined whether the retrieval target region based on battery temperature belongs to the final charging period region (1) shown in FIG. 5 in a step S232. If it belongs to the final charging period region (1) ('In' in the step S232), the counter is incremented by 3 (in a step S234). If it does not belong to the final charging region (1) ('Out' in the step S232), it is then determined whether the target region belongs to the final charging period region (2) shown in FIG. 5 (in a step S236). If it belongs to the final charging period region (2) ('In' in the step S236), the counter is incremented by 6 (in a step S238).

Next, it is determined whether a change in voltage dV/dt is a low negative value (indicating the beginning of the final charging period) (in a step S240). If dV/dt is a low negative value ('Yes' in the step S240), the counter is incremented by 2 (in a step S242). If dV/dt is not a low negative value ('No' in the step S240), it is then determined whether dV/dt is a high negative value (indicating the end of the final charging period) (in a step S246). If dV/dt is a high negative value ('Yes' in the step S246), the counter is incremented by 4 (in a step S242). If dV/dt is not a high negative value ('No' in the step S246), it is then determined whether the retrieval target region based on battery temperature belongs to the final charging period region (1) or (2) shown in FIG. 5 (in a step S256). If it does not belong to either the final charging region (1) or (2) ('No' in the step S256), the counter is reset as judging that charge completion determination based on battery voltage is not appropriate (in a step S258). If it belongs to either the final charging period region (1) or (2), ('Yes' in the step S256), the processing goes to a step S260.

In the step S260, it is determined whether the value of the counter exceeds 24. If it exceeds 24 ('Yes' in the step S260), battery charge is completed (in the step S70). If it does not exceed 24 ('No' in the step S260), the processing goes to the step 60 to continue battery charge.

In the fourth embodiment, the battery charger makes determinations based on voltage and temperature, thereby making it possible to appropriately determine the completion of battery charge even if charging a battery which is close to fully charged, charging a battery which is left for a long time and which capacity is zero (in which case, the increase of dT/dt in the final charging period tends to be slow), or when a change in battery temperature is difficult to detect because of the large difference between battery temperature and environmental temperature (such as, for example, the battery temperature is high, the environmental temperature is low and the battery is cooled by the outside air).

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. A battery charger comprising:

a storage device storing a map, in which an allowable current value, with which a battery can be charged while a temperature rise of the battery is being suppressed, is mapped based on a battery temperature value and a battery temperature rise value;

temperature detecting means for detecting a present battery temperature;

temperature rise value outputting means for obtaining the temperature rise value from the temperature detected by said temperature detecting means;

charging state determining means for detecting a battery voltage and determining whether a battery state is in a final charging period based on change of the battery voltage;

allowable current value retrieving means for retrieving the map corresponding to the battery charger temperature, based on the temperature detected by said temperature detecting means and the temperature rise value outputted from said temperature rise value outputting means, and for obtaining said allowable current value, the allowable current value retrieving means obtaining a relatively high allowable value if it is determined that the battery state is not in the final charging period by said charging state determining means; and charging means for charging the battery with the allowable current value retrieved by said allowable current value retrieving means.

2. The battery charger according to claim 1, wherein said charge state determining means obtains a change in battery voltage based on voltage values having a same allowable current value switch pattern by said charging means.

3. The battery charger according to claim 2, comprising charge completing means for detecting the battery voltage and for completing battery charge if charge completion is determined based on a battery voltage decrease value.

4. The battery charger according to claim 1, comprising charge completing means for detecting the battery voltage and for completing battery charge if charge completion is determined based on a battery voltage decrease value.

5. The battery charger according to claim 1 wherein the allowable current value is set at a low value if the battery temperature value is high and is set at a low value if the temperature rise value is high.

6. The battery charger according to claim 1 including:

first count value outputting means for determining whether the temperature detected by said temperature detecting means and the temperature rise value outputted from said temperature rise value outputting means belong to a region which tends to occur in a final charging period in the map of said storage device, for outputting a low count value if the temperature detected by said temperature detecting means and the temperature rise value outputted from said temperature rise value outputting means belong to the region which tends to occur at a beginning of the final charging period and for outputting a high count value if they belong to a region which tends to occur at an end of the final charging period; and second count value outputting means for detecting a battery voltage and outputting a count value if it is determined that a battery state is in the final charging period based on a battery voltage decrease value.

7. The battery charger according to claim 6 including:

charge completion determining means for determining completion of battery charge if a sum of the count values outputted from said first count value outputting means and said second count value outputting means exceeds a present value; and charge completing means for completing the battery charge based on determination of completion of battery charge by said charge completion determining means.

8. A battery charger characterized by comprising;

a storage device storing a map, in which an allowable current value, with which a battery can be charged while a temperature rise of the battery is being suppressed, is mapped based on a battery temperature value and a battery temperature rise value, the allowable current value set at a low value if the battery temperature value is high and set at a low value if the temperature rise value is high;

temperature detecting means for detecting a present battery temperature;

temperature rise value outputting means for obtaining the temperature rise value from the temperature detected by said temperature detecting means;

allowable current value retrieving means for retrieving the map of said storage device based on the temperature detected by said temperature detecting means and the temperature rise value outputted from said temperature rise value outputting means, and for obtaining said allowable current value;

charging means for charging the battery with the allowable current value retrieved by said allowable current value retrieving means;

first count value outputting means for determining whether the temperature detected by said temperature detecting means and the temperature rise value outputted from said temperature rise value outputting means belong to a region which tends to occur in a final charging period in the map of said storage device, for outputting a low count value if the temperature detected by said temperature detecting means and the temperature rise value outputted from said temperature rise value outputting means belong to the region which tends to occur at a beginning of the final charging period and for outputting a high count value if they belong to a region which tends to occur at an end of the final charging period;

second count value outputting means for detecting a battery voltage and outputting a count value if it is determined that a battery state is in the final charging period based on a battery voltage decrease value;

charge completion determining means for determining completion of battery charge if a sum of the count values outputted from said first count value outputting means and said second count value outputting means exceeds a preset value; and charge completing means for completing the battery charge based on determination of completion of battery charge by said charge completion determining means.

9. The battery charger according to claim 8, wherein said second count value outputting means obtains the battery voltage decrease value based on voltage values having a same allowable current value switch pattern by said charging means.

10. A battery charger comprising:

a storage device storing a map, in which an allowable current value, with which a battery can be charged while a temperature rise of the battery is being suppressed, is mapped based on a battery temperature value and a battery temperature rise value, in accordance with at least a final charging period and a period before the final charging period;

temperature detecting means for detecting a present battery temperature;

temperature rise value outputting means for obtaining the temperature rise value from the temperature detected by said temperature detecting means;

charge state detecting means for detecting a battery voltage and for determining whether a battery state is in the final charging period based on change of the battery voltage;

allowable current value retrieving means for retrieving the map corresponding to the battery state determined by said charge state determining means, based on the temperature detected by said temperature detecting means and the temperature rise value outputted from said temperature rise value outputting means, and for obtaining said allowable current value; and charging means for charging the battery with the allowable current value retrieved by said allowable current value retrieving means.

11. The battery charger according to claim 10, wherein said charge state determining means obtains a change in battery voltage based on voltage values having a same allowable current value switch pattern by said charging means.

12. The battery charger according to claim 10, comprising charge completing means for detecting the battery voltage and for completing battery charge if charge completion is determined based on a battery voltage decrease value.

13. The battery charger according to claim 10 wherein the allowable current value is set at a low value if the battery temperature value is high and is set at a low value if the temperature rise value is high.

14. The battery charger according to claim 10 including:

first count value outputting means for determining whether the temperature detected by said temperature detecting means and the temperature rise value outputted from said temperature rise value outputting means belong to a region which tends to occur in a final charging period in the map of said storage device, for outputting a low count value if the temperature detected by said temperature detecting means and the temperature rise value outputted from said temperature rise value outputting means belong to the region which tends to occur at a beginning of the final charging period and for outputting a high count value if they belong to a region which tends to occur at an end of the final charging period; and second count value outputting means for detecting a battery voltage and outputting a count value if it is determined that a battery state is in the final charging period based on a battery voltage decrease value.

15. The battery charger according to claim 14 including:

charge completion determining means for determining completion of battery charge if a sum of the count values outputted from said first count value outputting means and said second count value outputting means exceeds a present value; and charge completing means for completing the battery charge based on determination of completion of battery charge by said charge completion determining means.

* * * * *